(12) United States Patent
Gong et al.

(10) Patent No.: US 11,055,144 B2
(45) Date of Patent: Jul. 6, 2021

(54) METHOD, APPARATUS, AND SYSTEM FOR MULTI-MODULE SCHEDULING

(71) Applicant: TuSimple, Inc., San Diego, CA (US)

(72) Inventors: Yifan Gong, Beijing (CN); Siyuan Liu, Beijing (CN); Dinghua Li, Beijing (CN); Jiangming Jin, Beijing (CN); Lei Su, Beijing (CN); Yixin Yang, Beijing (CN); Wei Liu, Beijing (CN); Zehua Huang, Beijing (CN)

(73) Assignee: TUSIMPLE, INC., San Diego, CA (US)

( * ) Notice: Subject to any disclaimer, the term of this patent is extended or adjusted under 35 U.S.C. 154(b) by 84 days.

(21) Appl. No.: 16/276,084

(22) Filed: Feb. 14, 2019

(65) Prior Publication Data
US 2019/0286489 A1    Sep. 19, 2019

(30) Foreign Application Priority Data
Dec. 14, 2017  (CN) .......................... 201711341869.2

(51) Int. Cl.
*G06F 9/50* (2006.01)
*G06F 9/54* (2006.01)
*G06K 9/62* (2006.01)

(52) U.S. Cl.
CPC ............ *G06F 9/5038* (2013.01); *G06F 9/542* (2013.01); *G06K 9/6224* (2013.01); *G06F 2209/5011* (2013.01); *G06F 2209/5018* (2013.01)

(58) Field of Classification Search
CPC .......... G06F 9/542; G06F 9/50; G06K 9/6224
See application file for complete search history.

(56) References Cited

U.S. PATENT DOCUMENTS

2005/0071438 A1* 3/2005 Liao .................... G06F 9/3842
                                                        709/214
2005/0081206 A1* 4/2005 Armstrong .......... G06F 11/3612
                                                        718/100

(Continued)

FOREIGN PATENT DOCUMENTS

CN          103809966 A    5/2014
CN          104662535 A    5/2015

(Continued)

OTHER PUBLICATIONS

No Author. Chinese Application No. 201711341869.2 First Search Report dated Aug. 19, 2020, pp. 1-2.

(Continued)

*Primary Examiner* — Tuan C Dao
(74) *Attorney, Agent, or Firm* — Paul Liu; Perkins Coie, LLP

(57) ABSTRACT

The present disclosure provides a method, an apparatus and a system for multi-module scheduling, capable of solving the problem associated with inconsistency in data inputted to a computing module in the multi-module scheduling technique in the related art. The method includes: reading, by a master process, a pre-stored configuration file storing a directed computation graph; initializing, by the master process, states of all the nodes and connecting edges in the directed computation graph initially in computation in a current computing period; determining a node to be called based on the computation direction in the directed computation graph and the states of the nodes, the node to be called comprising a node having all of its input edges in a complete state; transmitting, to the computing module in the slave process corresponding to the node to be called, a call request of Remote Process Call (RPC) to execute the computing module; updating the state of the node and the state of each output edge of the node upon receiving a response to the call (Continued)

request; and proceeding with a next computing period upon determining that the states of all the nodes have been updated.

16 Claims, 6 Drawing Sheets

(56) References Cited

U.S. PATENT DOCUMENTS

| | | | | |
|---|---|---|---|---|
| 2010/0257538 | A1* | 10/2010 | Zhao | G06F 9/5033 718/106 |
| 2011/0016123 | A1* | 1/2011 | Pandey | G06F 16/2308 707/737 |
| 2012/0079490 | A1 | 3/2012 | Bong | |
| 2013/0262053 | A1* | 10/2013 | Plost | G01V 99/005 703/2 |
| 2014/0156601 | A1 | 6/2014 | Strunk et al. | |
| 2016/0188566 | A1* | 6/2016 | Jifroodian-Haghighi | G09B 5/02 704/10 |
| 2016/0188789 | A1* | 6/2016 | Kisiel | G16B 50/00 703/11 |
| 2017/0180462 | A1* | 6/2017 | Leonelli | G06F 8/35 |
| 2018/0063557 | A1* | 3/2018 | Martel | H04N 21/2187 |
| 2018/0113965 | A1* | 4/2018 | Harris | G06F 9/5066 |
| 2018/0349212 | A1 | 12/2018 | Liu | |
| 2019/0317804 | A1 | 10/2019 | Gong | |

FOREIGN PATENT DOCUMENTS

| | | |
|---|---|---|
| CN | 106250563 A | 12/2016 |
| CN | 106605209 A | 4/2017 |
| CN | 109960570 A | 12/2017 |

OTHER PUBLICATIONS

No Author. Chinese Application No. 201711341869.2 First Office Action dated Aug. 19, 2020, pp. 1-72.

* cited by examiner

METHOD, APPARATUS, AND SYSTEM FOR MULTI-MODULE SCHEDULING

CROSS-REFERENCE TO RELATED APPLICATION(S)

This U.S. patent document claims the priority of and the benefits of Chinese Patent Application No. 201711341869.2 of the same title and content that was filed by Applicant Beijing Tusen Weilai Technology Co., Ltd. at the State Intellectual Property Office of China (SIPO) on Dec. 14, 2017.

TECHNICAL FIELD

The present disclosure relates to computer science, and more particularly, to a method, an apparatus and a system for multi-module scheduling.

BACKGROUND

Currently in the field of deep learning, many learning modules are provided in one learning task. Typically the following scheme is used for multi-module scheduling. Each module is encapsulated as one process and, between modules, required input data is obtained and output data is transmitted by publishing and subscribing to messages in accordance with a socket communication mechanism between processes. This scheme is advantageous in that inter-machine communication between processes can be provided, such that processes of respective modules can be distributed across different machines, without the need for modifications to system architecture.

For a deep learning task in the autonomous driving technology as an example, as shown in FIG. 1, the following modules are running on one single machine 1: Camera 1, Vehicle Detection 1, Vehicle Tracking 1, Camera 2, Vehicle Detection 2, Vehicle Tracking 2 and Fusion 1; and the following modules are running on one single machine 2: Camera 3, Vehicle Detection 3, Vehicle Tracking 3 and Segmentation 5. Each of these modules is encapsulated as an individual process. Vehicle Detection 1 obtains a first frame of image, Data P11, outputted from Camera 1, processes Data P11 and outputs Data P11'. Vehicle Tracking 1 obtains Data P11 outputted from the camera 1 and Data P11' outputted from Vehicle Detection 1, and processes Data P11 and Data P11' to obtain Data G11. Also, Vehicle Detection 2 and Vehicle Tracking 2, and Vehicle Detection 3 and Vehicle Tracking 3, perform similar processes and obtain Data G21 and Data G31, respectively. Segmentation 5 obtains Data P31 outputted from Camera 3, and processes Data P31 to obtain Data Q31. Fusion 1 obtains Data G11, Data G21, Data G31 and Data Q31 from Vehicle Tracking 1, Vehicle Tracking 2, Vehicle Tracking 3 and Segmentation 5, respectively, processes the data to obtain a result and outputs the result to a controller. A socket mechanism is used as a communication mechanism between the processes in FIG. 1, in which the required input data and output data of the processes are obtained by posing and subscribing to messages.

However, there are at least two problems in the above multi-module scheduling scheme.

First, there may be inconsistency in data inputted to a computing module. For example, the process Vehicle Tracking 1 in FIG. 1 needs Data P11 outputted from the process Camera 1 and Data P11' outputted from the process Vehicle Detection 1. However, due to delay in information transmission in accordance with the messaging mechanism used in the system, when Vehicle Detection 1 transmits the output Data P1' to the Vehicle Tracking 1, the data received by Vehicle Tracking 1 from Camera 1 is a second frame of image, P12, instead of the first frame of image P11, which may result in computation errors in the process Vehicle Tracking 1. When there are a larger number of modules, this inconsistency problem will be more significant and will lead to more computation errors.

Second, there may be a significant delay in data transmission between computing modules. As each computing module is encapsulated as an individual process and data is transmitted between processes in accordance with a communication mechanism, when a huge amount of image information is communicated between the processes, such communication requires a large number of operations such as serialization, deserialization, compression and decompression, which will greatly increase communication overhead and processing time length. A test has shown that, in one single machine, there is a delay of around 5 milliseconds (ms) for transmitting and receiving one image between processes, and the delay may be up to 40 ms for transmission between processes in two machines. Such a high delay significantly increases the overall delay of the system and greatly degrades the throughput of the system.

SUMMARY

In view of the above problem, the present disclosure provides a method, an apparatus and a system for multi-module scheduling, capable of solving at least one of the problems associated with the multi-module scheduling technique in the related art, i.e., inconsistency in data inputted to a computing module, and a significant delay in data transmission between computing modules.

In an aspect of the present disclosure, a method for multi-module scheduling is provided. The method includes: reading, by a master process, a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; initializing, by the master process, states of all the nodes and connecting edges initially in computation in a current computing period; determining a node to be called based on the computation direction in the directed computation graph and the states of the nodes, the node to be called including a node having all of its input edges in a complete state; transmitting, to the computing module in the slave process corresponding to the node to be called, a call request of Remote Process Call (RPC) to execute the computing module; updating the state of the node and the state of each output edge of the node upon receiving a response to the call request; and proceeding with a next computing period upon determining that the states of all the nodes have been updated.

In another aspect of the present disclosure, a method for multi-module scheduling is provided. The method includes: receiving, by a computing module in a slave process in a current computing period, a call request of Remote Process Call (RPC) from a master process, wherein the slave process includes a plurality of computing modules grouped in accordance with a computation direction, and wherein for the computing module having a plurality of pieces of input data, the call request is transmitted by the master process when determining that all of the plurality of pieces of input data to the computing module are ready; performing, by the computing module, processing in response to the call request; and feeding, by the computing module, a response back to the master process when the processing has completed.

In another aspect of the present disclosure, an apparatus for multi-module scheduling is provided. The apparatus includes: a reading module configured to read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; and an executing module configured to initialize states of all the nodes and connecting edges initially in computation in a current computing period; determine a node to be called based on the computation direction in the directed computation graph and the states of the nodes, the node to be called including a node having all of its input edges in a complete state; transmit, to the computing module in the slave process corresponding to the node to be called, a call request of Remote Process Call (RPC) to execute the computing module; update the state of the node and the state of each output edge of the node upon receiving a response to the call request; and proceed with a next computing period upon determining that the states of all the nodes have been updated.

In another aspect of the present disclosure, an apparatus for multi-module scheduling is provided. The apparatus is applied in a slave process including a plurality of apparatuses for multi-module scheduling grouped in accordance with a computation direction. The apparatus includes: a receiving module configured to receive, in a current computing period, a call request of Remote Process Call (RPC) from a master process, wherein for the apparatus for multi-module scheduling having a plurality of pieces of input data, the call request is transmitted by the master process when determining that all of the plurality of pieces of input data to the apparatus for multi-module scheduling are ready; an executing module configured to perform processing in response to the call request; and a feedback module configured to feed a response back to the master process when the processing by the executing module has completed.

In another aspect of the present disclosure, an apparatus for multi-module scheduling is provided. The apparatus includes a processor and at least one memory storing at least one machine executable instruction. The processor is operative to execute the at least one machine executable instruction to: read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; initialize states of all the nodes and connecting edges initially in computation in a current computing period; determine a node to be called based on the computation direction in the directed computation graph and the states of the nodes, the node to be called including a node having all of its input edges in a complete state; transmit, to the computing module in the slave process corresponding to the node to be called, a call request of Remote Process Call (RPC) to execute the computing module; update the state of the node and the state of each output edge of the node upon receiving a response to the call request; and proceed with a next computing period upon determining that the states of all the nodes have been updated.

In another aspect of the present disclosure, an apparatus for multi-module scheduling is provided. The apparatus includes a processor and at least one memory storing at least one machine executable instruction. The processor is operative to execute the at least one machine executable instruction to: receive, in a current computing period, a call request of Remote Process Call (RPC) from a master process, wherein for the apparatus for multi-module scheduling having a plurality of pieces of input data, the call request is transmitted by the master process when determining that all of the plurality of pieces of input data to the apparatus for multi-module scheduling are ready; perform processing in response to the call request; and feed a response back to the master process when the processing has completed.

In another aspect of the present disclosure, a system for multi-module scheduling is provided. The system includes a master process and a plurality of slave processes each including a plurality of computing modules grouped in accordance with a computation direction. The master process is configured to read a pre-stored configuration file storing a directed computation graph associated with a computing task, the computing task including a plurality of slave processes, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; initialize states of all the nodes and connecting edges initially in computation in a current computing period; determine a node to be called based on a computation direction in the directed computation graph and the states of the nodes, the node to be called including a node having all of its input edges in a complete state; transmit, to the computing module in the slave process corresponding to the node to be called, a call request of Remote Process Call (RPC) to execute the computing module; update the state of the node and the state of each output edge of the node upon receiving a response to the call request; and proceed with a next computing period upon determining that the states of all the nodes have been updated. One computing module in the slave process is configured to receive the call request of RPC from the master process, perform processing in response to the call request; and feed a response back to the master process when the processing has completed.

With the solutions according to the embodiments of the present disclosure, a master process controls computation logics of all computing modules in a slave process in accordance with a directed computation graph. That is, the master process controls execution of the computing modules by means of RPC, and maintains states of nodes corresponding to the modules and states of outputs of the nodes based on executions of the modules. A computing module corresponding to a node may be called and executed only when the states of all input edges of the node are complete, and the state of the node and the state of each output edge of the node are updated when a response is received. That is, a computing module will be called and executed only when all pieces of input data in one computing period are complete, such that the consistency in the input data to the computing module may be guaranteed.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures:

FIG. 3c is a flowchart illustrating a processing flow of step 302 in FIG. 3a;

DETAILED DESCRIPTION OF THE EMBODIMENTS

Figure 1:
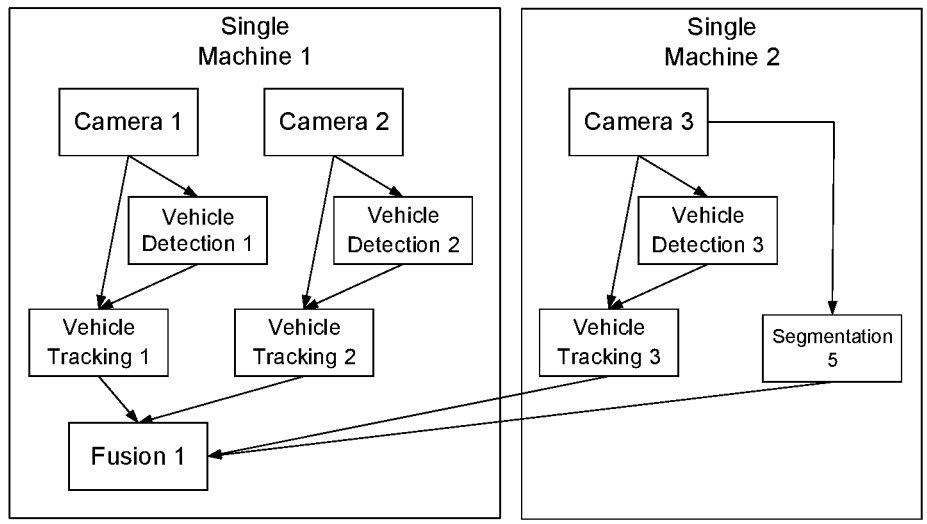
FIG. 1 is a schematic diagram showing an architecture of a learning task including multiple modules in the related art.

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In view of the problems associated with the multi-module scheduling solution in the related art, i.e., inconsistency in data inputted to a computing module, and a significant delay in communication between computing modules, the present disclosure provides a solution for multi-module scheduling, capable of solving at least one of the above problems in the related art.

In a solution according to the present disclosure, a master process and a plurality of slave processes are provided. Each slave process includes a plurality of computing modules grouped in accordance with a computation direction. The master process has a directed computation graph pre-stored therein. The directed computation graph includes a plurality of nodes each corresponding to one computing module in one slave process. At least two of the nodes have a connecting edge therebetween. An incoming connecting edge of a node is an input edge and an outgoing connecting edge of a node is an output edge. The master process controls computation logics of all the computing modules in the slave process in accordance with the directed computation graph. That is, the master process controls execution of the computing modules by means of RPC, and maintains states of the nodes corresponding to the modules and states of outputs of the nodes based on executions of the modules. A computing module corresponding to a node may be called and executed only when the states of all input edges of the node are complete, and the state of the node and the state of each output edge of the node are updated when a response is received. That is, a computing module will be called for execution only when all pieces of input data in one computing period are complete, such that the consistency in the input data to the computing module may be guaranteed.

Furthermore, each slave process includes a plurality of computing modules grouped in accordance with a computation direction. Each slave process has a corresponding shared storage space including a storage space for each computing module in the process. Instead of transmitting data between the computing modules in accordance with the communication mechanism between processes, data is read and written using the storage space shared within the process, so as to achieve improved communication efficiency between the computing modules, reduced communication delay, improved overall communication efficiency among multiple modules and increased system throughput.

In the following, the solutions according to the present disclosure will be described in detail with reference to the figures.

Figure 2:
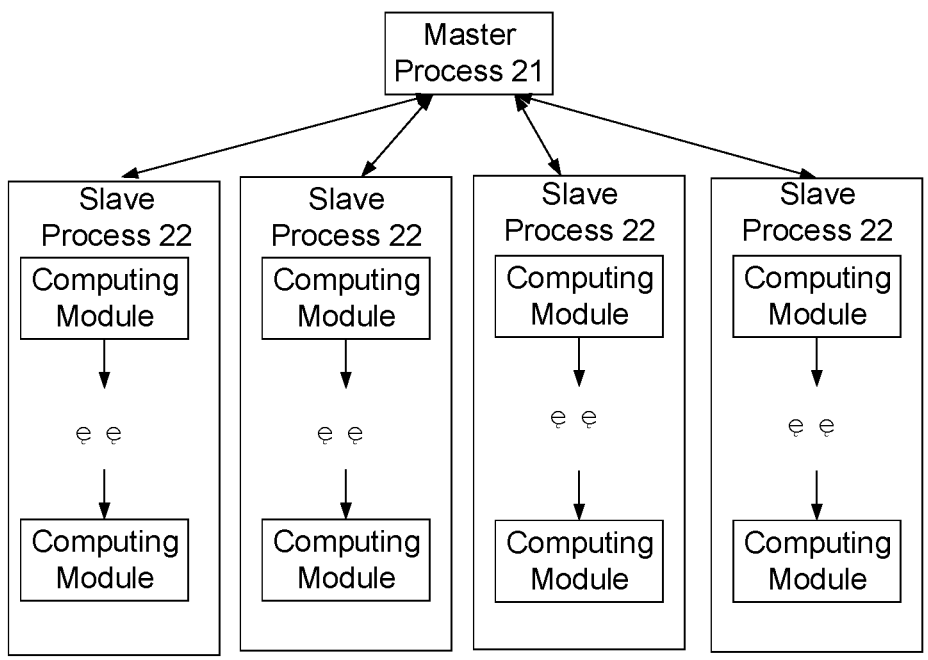
FIG. 2 is a schematic diagram showing a structure of a system for multi-module scheduling according to some embodiments of the present disclosure.

FIG. 2 is a schematic diagram showing a structure of a system for multi-module scheduling according to some embodiments of the present disclosure. The system includes a master process 21 and a plurality of slave processes 22. The master process 21 and the slave processes 22 may be configured in one terminal or over a plurality of terminals. The plurality of slave processes 22 may be configured separately or in a centralized manner. Each slave process includes a plurality of computing modules grouped in accordance with a computation direction.

The master process 21 may be configured to control computing logics of the computing modules in each slave process 22. That is, the master process 21 is configured to call the respective computing modules in each slave process for execution, and maintain and update states of the respective computing modules in each slave process 22. Each computing module in each slave process 22 performs processing in response to the call by the master process.

In particular, the master process 21 may be configured to read a pre-stored configuration file storing a directed computation graph associated with a computing task. The computing task includes a plurality of slave processes 22 each including a plurality of computing modules grouped in accordance with a computation direction. The directed computation graph includes a plurality of nodes each corresponding to one computing module in one slave process 22. At least two of the nodes have a connecting edge therebetween. An incoming connecting edge of a node is an input edge and an outgoing connecting edge of a node is an output edge. The master process 21 initializes states of all the nodes and connecting edges initially in computation in a current computing period. A node to be called is determined based on the computation direction in the directed computation graph and the states of the nodes. The node to be called includes a node having all of its input edges in a complete state. A call request of Remote Process Call (RPC) is transmitted to the computing module in the slave process corresponding to the node to be called to execute the computing module. The state of the node and the state of each output edge of the node are updated upon receiving a response to the call request. The master process proceeds with a next computing period upon determining that the states of all the nodes have been updated.

A computing module in the slave process 22 receives the call request of RPC from the master process. The computing module performs processing in response to the call request. The computing module feeds a response back to the master process when the processing has completed.

In the following, the operation principles of the master process 21 and the slave processes 22 will be explained.

Figure 3A:
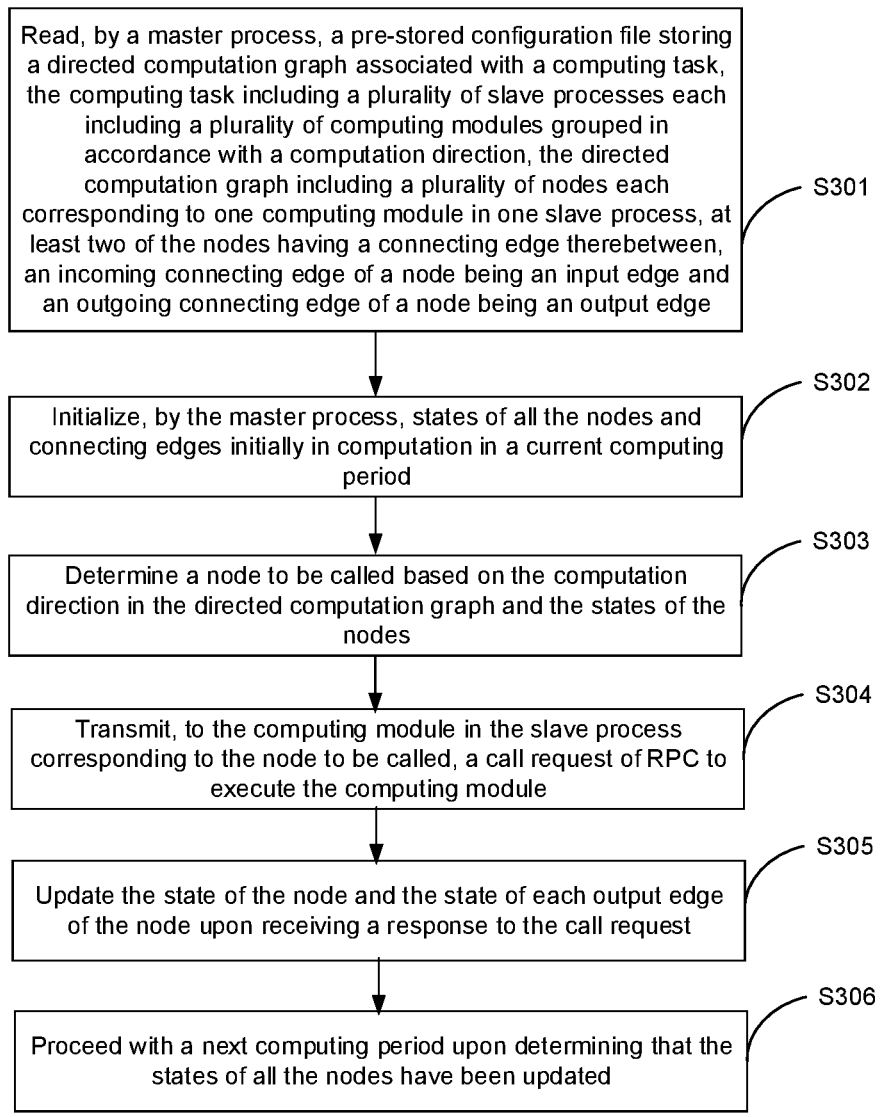
FIG. 3a is a flowchart illustrating a method for multi-module scheduling according to some embodiments of the present disclosure.

FIG. 3a is a flowchart illustrating a method for multi-module scheduling according to some embodiments of the present disclosure. The method may be applied in the master process 21 shown in FIG. 2. As shown in FIG. 3a, the method includes the following processing flow.

Figure 3B:
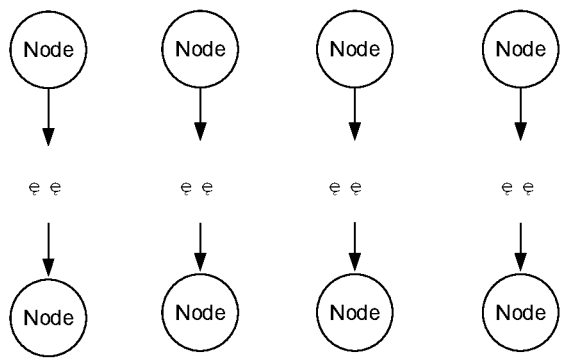
FIG. 3b is a directed computation graph corresponding to a slave process in FIG. 2.

At step 301, the master process reads a pre-stored configuration file storing a directed computation graph associated with a computing task. The computing task includes a plurality of slave processes each including a plurality of computing modules grouped in accordance with a computation direction. FIG. 3b shows an exemplary directed computation graph. As shown in FIG. 3b, the directed computation graph includes a plurality of nodes each corresponding to one computing module in one slave process. At least two of the nodes have a connecting edge therebetween. An incoming connecting edge of a node is an input edge and an outgoing connecting edge of a node is an output edge.

Here, the master process may include a master thread and a thread pool including a plurality of slave threads.

At step 302, the master process initializes states of all the nodes and connecting edges initially in computation in a current computing period.

Here, the state of each node may include unready, ready, run or done. The state of each connecting edge may include uncomplete or complete.

Figure 3C:
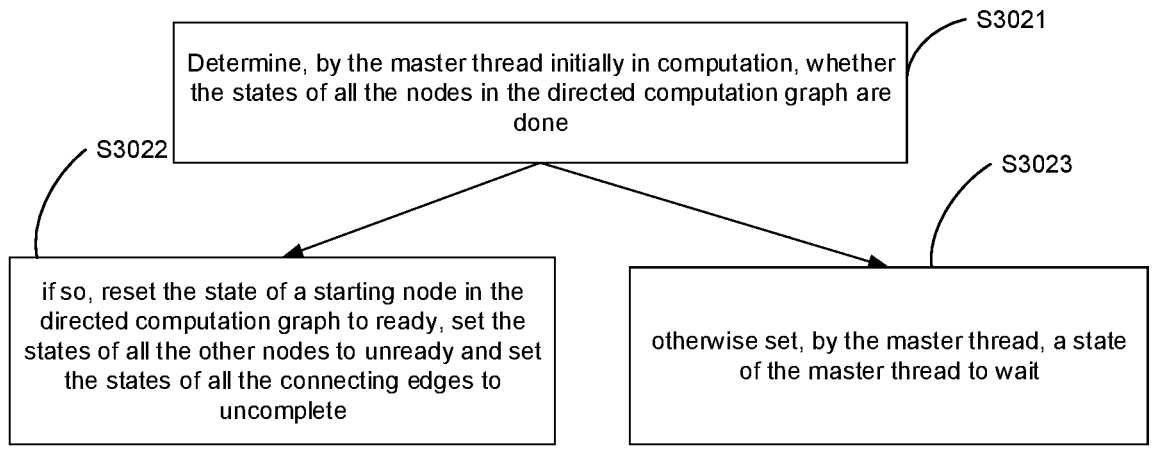

In an embodiment, the step 302 may include the processing flow shown in FIG. 3c.

At step 3021, initially in computation, the master thread determines whether the states of all the nodes in the directed computation graph are done.

That is, the master thread determines whether there is any node having its corresponding computing module in processing or execution. If the states of all the nodes are done, the processing of all computing modules have completed and thus the previous computing period has ended and the current computing period has just begun. If there is one or more nodes not in the done state, one or more computing modules are to be called and in processing and thus the current computing period has not ended.

At step 3022, if the states of all the nodes in the directed computation graph are done, the state of a starting node in the directed computation graph is reset to ready, the states of all the other nodes are set to unready and the states of all the connecting edges are set to uncomplete.

When the previous computing period has ended and the current computing period has just begun, the master thread only modifies the state of the starting node into ready, such that the starting node may be called and the other nodes may wait to be called.

At step 3023, if not all the nodes in the directed computation graph are in the done state, the master thread sets its own state to wait. That is, the current computing period has not ended and the master thread waits for the current computing period to end.

When the current computing period has not ended and some computing modules in the slave processes are to be called or in processing, the master thread cannot proceed with the next computing period and has to stay in the wait state.

At step 303, a node to be called is determined based on the computation direction in the directed computation graph and the states of the nodes.

In an embodiment, initially in computation, after initializing the states of all the nodes and connecting edges, the master thread may traverse the states of the respective nodes in the directed computation graph in accordance with the computation direction, determine the node in the ready state as a node to be called, the node in the ready state including the starting node, modify the state of the node to be called into run, push the node to be called into a computing queue and proceed with the next computing period. Upon entering the next computing period, the master thread performs step 3021. When determining that there is currently one or more nodes not in the done state, the master thread proceeds with step 3023, entering the wait state.

That is, initially in computation in the current computing period, the node to be called includes only the starting node. After pushing the node to be called into the computing queue, the master thread has completed its processing in the current computing period. However, the current computing period has not ended yet, and the master thread enters the wait state, waiting for the next computing period.

Alternatively, in computation, one slave thread in the thread pool may traverse the states of the respective nodes in the directed computation graph in accordance with the computation direction, determine each node in the ready state as a node to be called, modify the state of each node to be called into run, and push each node to be called into a computing queue.

That is, in computation in the current computing period, a node is a node to be called only when all of its input edges are in the complete state. Accordingly, a computing module may be called only when a plurality of pieces of input data to the computing module in one computing period are all ready, such that the consistency in the data inputted to the computing module may be guaranteed in multi-module scheduling.

At step 304, a call request of RPC is transmitted to the computing module in the slave process corresponding to the node to be called to execute the computing module.

In an embodiment, one slave thread in the thread pool may take one node from the computing queue and transmit the call request of RPC to the computing module in the slave process corresponding to the one node Further, in another embodiment, one slave thread in the thread pool may determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request.

Here, the storage address of the output data from the computing module may be an address, corresponding to the computing module, in a shared storage space corresponding to the slave process in which the computing module is included. Alternatively, the storage address of the output data may be an address corresponding to the computing module in a shared storage space corresponding to another slave process, i.e., a storage address corresponding to the computing module is assigned in the other slave process. The storage address of the input data to the computing module may be an address in the shared storage space corresponding to the slave process in which the computing module is included.

That is, each slave process has a corresponding shared storage space, in which each computing module of the slave process has a corresponding storage space. Each computing module writes its processing result, i.e., output data, into its corresponding storage space. In accordance with the computation direction, when the output data from one computing module is the input data to another computing module, the storage address of the input data to the other computing module is the storage address of the output data from the computing module.

When one computing module needs output data from another computing module in the same slave process as its input data, the master thread includes the address of the storage space for the other computing module in the call request, as the storage address of the input data to the computing module. The computing module reads its required input data directly from the storage space corresponding to the other computing module based on the call request.

When a computing module B in a current slave process needs output data from a computing module A in another slave process as its input data, the master thread includes the address for the computing module A of the storage space in the current slave process in the call request transmitted to the computing module B, as the storage address of the output data from the computing module A. The computing module B obtains data from the storage address for the computing module A in the shared storage space in the current slave process as its input data. This will be further explained later in connection with the operation principle of the slave process.

At step 305, the state of the node and the state of each output edge of the node are updated upon receiving a response to the call request.

In an embodiment, upon receiving the response to the call request transmitted for one node, one slave thread in the thread pool can set the state of the node to done, modify the state of each output edge of the node into complete, and set the state of each node having all its input edges in the complete state to ready.

In this way, when the computing module corresponding to the node has completed its processing, the slave thread sets the state of the node to done and modifies the state of each output edge of the node into complete, in accordance with the response. The node in the ready state and having all its input edges in the complete state is a node to be called. According to the processing in the above step 303, the slave thread will determine the node as a node to be called and push the node into the computing queue.

At step 306, the method proceeds with a next computing period upon determining that the states of all the nodes have been updated.

In an embodiment, one slave thread in the thread pool may traverse the states of the respective nodes in the directed computation graph, and when determining that the states of all the nodes in the directed computation graph are done, notify or wake the master thread in the wait state.

That is, when the states of all the nodes are done, the current computing period has completed and the processing may proceed with the next computing period. The slave thread may wake the master thread in the wait state to proceed with the next computing period.

It can be seen from the above processing that, with the method for multi-module scheduling at the master process according to the embodiments of the present disclosure, the master process may control computation logics of a plurality of computing modules in a slave process. In one computing period, a module corresponding to a node may be called for computing or processing only when the states of all input edges of the node are complete, such that the consistency in the input data to the computing module in one computing period may be guaranteed. The situation in which a plurality of pieces of data are from different computing periods may be avoided, so as to solve the problem in the related art associated with inconsistency in data inputted to the computing module.

Further, when the master process transmits a call request to a computing module in a slave process by means of RPC, the call request carries a storage address of input data to the computing module and a storage address of output data from the computing module. The storage address of the input data and the storage address of the output data are addresses in a shared storage space corresponding to the slave process. Data communication between these computing modules may be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, the output data may be written into the shared storage space for the other slave process across the processes, so as to achieve inter-process data communication between the computing modules.

Figure 4:
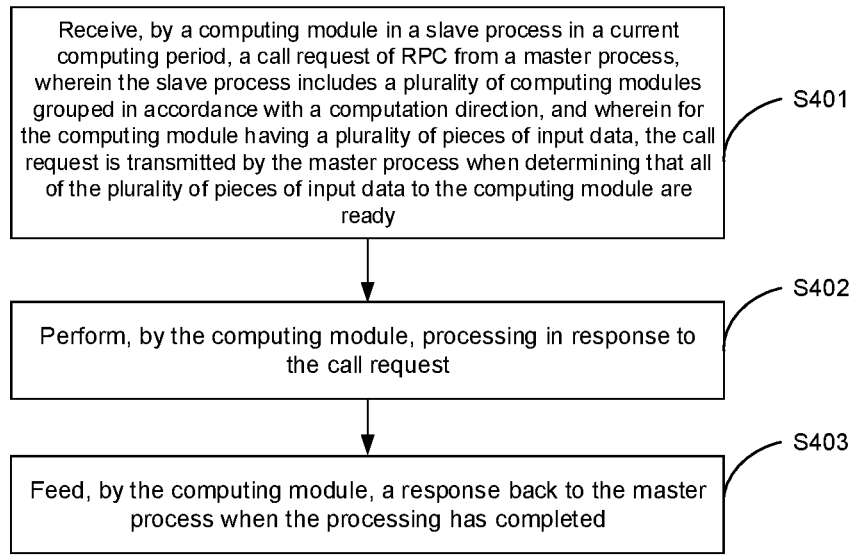
FIG. 4 is a flowchart illustrating another method for multi-module scheduling according to the present disclosure.

In an embodiment of the present disclosure, a method for multi-module scheduling is provided. The method may be applied in a slave process shown in FIG. 2. As shown in FIG. 4, the method for multi-module scheduling according to the present disclosure includes the following processing flow.

At step 401, in a current computing period, a computing module in a slave process receives a call request of RPC from a master process. The slave process includes a plurality of computing modules grouped in accordance with a computation direction. For the computing module having a plurality of pieces of input data, the call request is transmitted by the master process when determining that all of the plurality of pieces of input data to the computing module are ready.

In an embodiment, the received call request may include an identifier of the computer module, a storage address of input data to the computing module and/or a storage address of output data from the computing module. The storage address of the output data may be an address corresponding to the computing module in a shared storage space corresponding to the slave process, or the storage address of the output data may be an address corresponding to the computing module in a shared storage space corresponding to another slave process. The storage address of the input data may be an address in a shared storage space corresponding to the slave process.

In another embodiment, in order to facilitate the implementation and remote call of the computing module, the computing module may be encapsulated as a service function.

At step 402, the computing module performs processing in response to the call request.

Correspondingly to the above embodiments, in response to the call request, the computing module may read the input data from the storage address of the input data for processing, and write the output data into the storage address of the output data. When the storage address of the input data and the storage address of the output data are both in the shared storage space in the current slave process, data communication between the computing modules can be performed efficiently.

Further, when the storage address of the output data from the computing module is the corresponding address in the shared storage space for the other slave process, the computing module may write the processing result as the output data into the address corresponding to the computing module in the shared storage space for the other slave process, so as to achieve inter-process data communication between the computing modules.

At step 403, the computing module feeds a response back to the master process when the processing has completed.

It can be seen from the above processing that, with the method for multi-modules scheduling at the slave process according to the embodiments of the present disclosure, the slave process does not control the computation logics and the computing module performs processing in response to the call by the master process. For a computing module having a plurality of pieces of input data, the call request is transmitted by the master process when determining that all of the plurality of pieces of input data to the computing module are ready, such that the consistency in the input data to the computing module in one computing period may be guaranteed. The situation in which the plurality of pieces of data are from different computing periods may be avoided, so as to solve the problem in the related art associated with inconsistency in data inputted to the computing module.

Further, in response to the call request, the computing module in the slave process analyzes the call request to obtain the storage address of the input data to the computing module and the storage address of the output data from the computing module. The storage address of the input data and the storage address of the output data are both addresses in a shared storage space corresponding to the slave process. Data communication between these computing modules may be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Figure 5A:
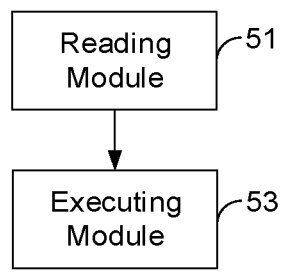
FIG. 5a is a schematic diagram showing a structure of an apparatus for multi-module scheduling according to some embodiments of the present disclosure.

Based on the same inventive concept, according to some embodiments of the present disclosure, an apparatus for multi-module scheduling is provided. As shown in FIG. 5a, the apparatus includes the following modules.

A reading module 51 may be configured to read a pre-stored configuration file storing a directed computation graph associated with a computing task. The computing task includes a plurality of slave processes each including a plurality of computing modules grouped in accordance with a computation direction. The directed computation graph includes a plurality of nodes each corresponding to one computing module in one slave process. At least two of the nodes have a connecting edge therebetween. An incoming connecting edge of a node is an input edge and an outgoing connecting edge of a node is an output edge.

A state of each node may include unready, ready, run or done. A state of each connecting edge may include uncomplete or complete.

An executing module 53 may be configured to initialize states of all the nodes and connecting edges initially in computation in a current computing period; determine a node to be called based on the computation direction in the directed computation graph and the states of the nodes, the node to be called including a node having all of its input edges in a complete state; transmit, to the computing module in the slave process corresponding to the node to be called, a call request of RPC to execute the computing module; update the state of the node and the state of each output edge of the node upon receiving a response to the call request; and proceed with a next computing period upon determining that the states of all the nodes have been updated.

Figure 5B:
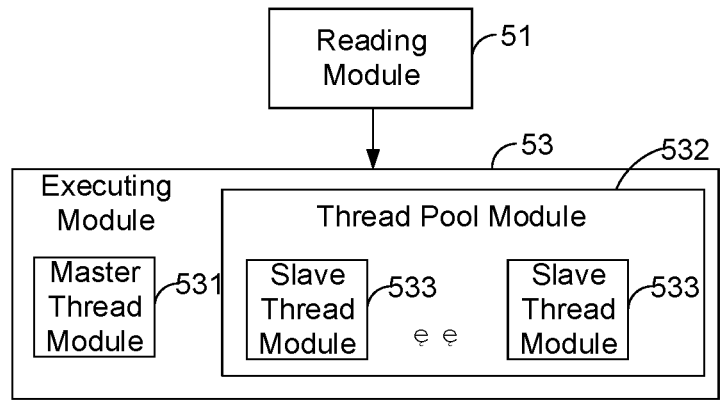
FIG. 5b is a schematic diagram showing another structure of an apparatus for multi-module scheduling according to some embodiments of the present disclosure.

In an embodiment, as shown in FIG. 5b, the executing module 53 can include a master thread module 531 and a thread pool module 532 including a plurality of slave thread modules 533.

The executing module 53 being configured to initialize the states of all the nodes and connecting edges initially in computation in the current computing period may include the master thread module 531 being configured to: determine initially in computation whether the states of all the nodes in the directed computation graph are done, and if so, reset the state of a starting node in the directed computation graph to ready, set the states of all the other nodes to unready and set the states of all the connecting edges to uncomplete, or otherwise set a state of the master thread 531 to wait.

The executing module 53 being configured to determine the node to be called based on the computation direction in the directed computation graph and the states of the nodes may include:

the master thread module 531 being configured to traverse, initially in computation after initializing the states of all the nodes and connecting edges, the states of the respective nodes in the directed computation graph in accordance with the computation direction, determine the node in the ready state as a node to be called, the node in the ready state including the starting node, modify the state of the node to be called into run, push the node to be called into a computing queue and proceed with the next computing period; or one slave thread module 533 in the thread pool module 532 being configured to traverse, in computation, the states of the respective nodes in the directed computation graph in accordance with the computation direction, determine each node in the ready state as a node to be called, the node in the ready state including the node having all of its input edges in the complete state, modify the state of each node to be called into run, and push each node to be called into a computing queue.

The executing module 53 being configured to transmit, to the computing module in the slave process corresponding to the node to be called, the call request of RPC to execute the computing module may include one slave thread module 533 in the thread pool module 532 being configured to: take one node from the computing queue and transmit the call request of RPC to the computing module in the slave process corresponding to the one node.

The slave thread module 533 may be further configured to: determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request. The storage address of the output data from the computing module may be an address corresponding to the computing module in a shared storage space corresponding to the slave process in which the computing module is included, or the storage address of the output data may be an address corresponding to the computing module in a shared storage space corresponding to another slave process. The storage address of the input data to the computing module may be an address in the shared storage space corresponding to the slave process in which the computing module is included.

The executing module 53 being configured to update the state of the node and the state of each output edge of the node upon receiving the response to the call request may include one slave thread module 533 in the thread pool module 532 being configured to: set, upon receiving the response to the call request transmitted for one node, the state of the node to done, modify the state of each output edge of the node into complete, and set the state of each node having all its input edges in the complete state to ready.

The executing module 53 being configured to proceed with the next computing period upon determining that the states of all the nodes have been updated may include one slave thread module 533 in the thread pool module 532 being configured to: traverse the states of the respective nodes in the directed computation graph, and when determining that the states of all the nodes in the directed computation graph are done, notify the master thread in the wait state to proceed with the next computing period.

With the apparatus for multi-module scheduling shown in FIG. 5a or FIG. 5b, the apparatus for multi-module scheduling serving as the master process may control computation logics of a plurality of computing modules in a slave process. In one computing period, a module corresponding to a node may be called for computing or processing only when the states of all input edges of the node are complete, such that the consistency in the input data to the computing module in the one computing period may be guaranteed. The situation in which a plurality of pieces of data are from different computing periods may be avoided, so as to solve the problem in the related art associated with inconsistency in data inputted to the computing module.

Further, when the master process (apparatus for multi-module scheduling) transmits a call request to a computing module in a slave process by means of RPC, the call request carries a storage address of input data to the computing module and a storage address of output data from the computing module. The storage address of the input data and the storage address of the output data are addresses in a shared storage space corresponding to the slave process. Data communication between these computing modules may be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Figure 6:
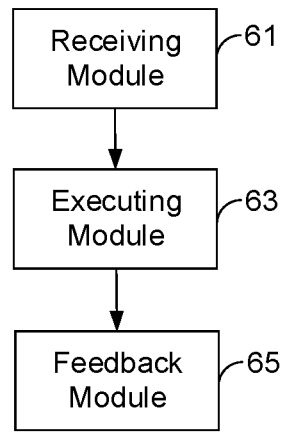
FIG. 6 is a schematic diagram showing a structure of an apparatus for multi-module scheduling according to some embodiments of the present disclosure.

Based on the same inventive concept, according to some embodiments of the present disclosure, an apparatus for multi-module scheduling is provided. The apparatus for multi-module scheduling may be applied in a slave process. As shown in FIG. 6, the apparatus includes the following modules.

A receiving module 61 is configured to receive, in a current computing period, a call request of RPC from a master process. For the apparatus for multi-module scheduling having a plurality of pieces of input data, the call request is transmitted by the master process when determining that all of the plurality of pieces of input data to the apparatus for multi-module scheduling are ready.

In an embodiment, the call request received by the receiving module may include an identifier of the computer module, a storage address of input data to the computing module and/or a storage address of output data from the computing module. The storage address of the output data may be an address corresponding to the computing module in a shared storage space corresponding to the slave process or may be an address corresponding to the computing module in a shared storage space corresponding to another slave process. The storage address of the input data may be an address in the shared storage space corresponding to the slave process.

An executing module 63 is configured to perform processing in response to the call request.

In an embodiment, the executing module 63 may be configured to read the input data from the storage address of the input data for processing, and write the output data into the storage address of the output data.

In an embodiment, when the storage address of the output data from the computing module is the address in the shared storage space corresponding to the other slave process, the computing module may write the processing result as the output data into the storage address corresponding to the apparatus for multi-module scheduling in the shared storage space for the other slave process.

A feedback module 65 is configured to feed a response back to the master process when the processing by the executing module has completed.

With the apparatus for multi-module scheduling at the slave process according to the embodiments of the present disclosure, the slave process does not control the computation logics and the apparatus for multi-module scheduling operating as the computing module performs processing in response to the call by the master process. For a computing module having a plurality of pieces of input data, the call request is transmitted by the master process when determining that all of the plurality of pieces of input data to the computing module are ready, such that the consistency in the input data to the computing module in one computing period may be guaranteed. The situation in which the plurality of pieces of data are from different computing periods may be avoided, so as to solve the problem in the related art associated with inconsistency in data inputted to the computing module.

Further, in response to the call request, the computing module (apparatus for multi-module scheduling) in the slave process analyzes the call request to obtain the storage address of the input data to the computing module and the storage address of the output data from the computing module. The storage address of the input data and the storage address of the output data are both addresses in a shared storage space corresponding to the slave process.

Data communication between these computing modules (apparatuses for multi-module scheduling) may be achieved by reading and writing data in the shared storage space, so as to improve the communication efficiency between the modules (apparatuses for multi-module scheduling), reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Figure 7:
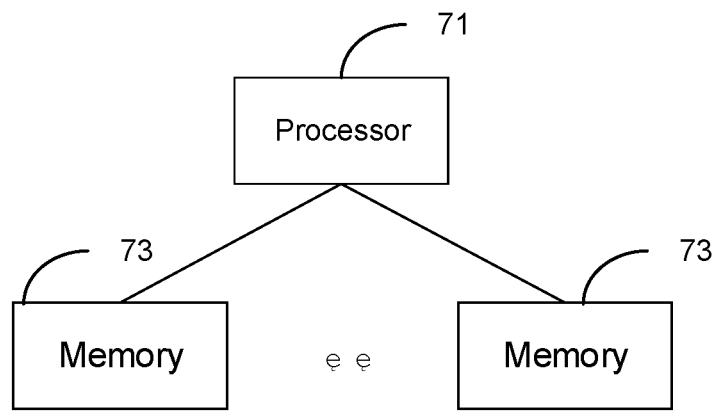
FIG. 7 is a schematic diagram showing a structure of an apparatus for multi-module scheduling according to some embodiments of the present disclosure.

Based on the same inventive concept, according to some embodiments of the present disclosure, an apparatus for multi-module scheduling is provided. As shown in FIG. 7, the apparatus includes a processor 71 and at least one memory 73 storing at least one machine executable instruction. The processor 71 is operative to execute the at least one machine executable instruction to:
  read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge;
  initialize states of all the nodes and connecting edges initially in computation in a current computing period;
  determine a node to be called based on the computation direction in the directed computation graph and the states of the nodes, the node to be called including a node having all of its input edges in a complete state;
  transmit, to the computing module in the slave process corresponding to the node to be called, a call request of RPC to execute the computing module;
  update the state of the node and the state of each output edge of the node upon receiving a response to the call request; and
  proceed with a next computing period upon determining that the states of all the nodes have been updated.

In an embodiment, the processor 71 is operative to execute the at least one machine executable instruction to provide a master thread and a thread pool including a plurality of slave threads. The state of each node can include unready, ready, run or done. The state of each connecting edge can include uncomplete or complete.

In an embodiment, the processor 71 being operative to execute the at least one machine executable instruction to initialize the states of all the nodes and connecting edges initially in computation in the current computing period may include the master thread being configured to: determine initially in computation whether the states of all the nodes in the directed computation graph are done, and if so, reset the state of a starting node in the directed computation graph to ready, set the states of all the other nodes to unready and set the states of all the connecting edges to uncomplete, or otherwise set a state of the master thread to wait.

In an embodiment, the processor 71 being operative to execute the at least one machine executable instruction to determine the node to be called based on the computation direction in the directed computation graph and the states of the nodes may include:
  the master thread being configured to traverse, initially in computation after initializing the states of all the nodes and connecting edges, the states of the respective nodes in the directed computation graph in accordance with the computation direction, determine the node in the ready state as a node to be called, the node in the ready state including the starting node, modify the state of the node to be called into run, push the node to be called into a computing queue and proceed with the next computing period; or
  one slave thread in the thread pool being configured to traverse, in computation, the states of the respective nodes in the directed computation graph in accordance with the computation direction, determine each node in the ready state as a node to be called, the node in the ready state including the node having all of its input edges in the complete state, modify the state of each node to be called into run, and push each node to be called into a computing queue.

In an embodiment, the processor 71 being operative to execute the at least one machine executable instruction to transmit, to the computing module in the slave process corresponding to the node to be called, the call request of RPC to execute the computing module may include one slave thread in the thread pool being configured to: take one node from the computing queue and transmit the call request of RPC to the computing module in the slave process corresponding to the one node.

In an embodiment, the processor 71 may be further operative to execute the at least one machine executable instruction to: determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request. The storage address of the output data from the computing module can be an address corresponding to the computing module in a shared storage space corresponding to the slave process in which the computing module is included, or the storage address of the output data can be an address corresponding to the computing module in a shared storage space corresponding to another slave process. The storage address of the input data to the computing module can be an address in the shared storage space corresponding to the slave process in which the computing module is included.

In an embodiment, the processor 71 being operative to execute the at least one machine executable instruction to update the state of the node and the state of each output edge of the node upon receiving the response to the call request may include one slave thread in the thread pool being configured to: set, upon receiving the response to the call request transmitted for one node, the state of the node to done, modify the state of each output edge of the node into complete, and set the state of each node having all its input edges in the complete state to ready.

In an embodiment, the processor 71 being operative to execute the at least one machine executable instruction to proceed with the next computing period upon determining that the states of all the nodes have been updated may include one slave thread in the thread pool being configured to: traverse the states of the respective nodes in the directed computation graph, and when determining that the states of all the nodes in the directed computation graph are done, notify the master thread in the wait state to proceed with the next computing period.

With the apparatus for multi-module scheduling shown in FIG. 7, the apparatus for multi-module scheduling serving as the master process can control computation logics of a plurality of computing modules in a slave process. In one computing period, a module corresponding to a node can be called for computing or processing only when the states of all input edges of the node are complete, such that the consistency in the input data to the computing module in the one computing period can be guaranteed. The situation in which a plurality of pieces of data are from different computing periods can be avoided, so as to solve the problem in the related art associated with inconsistency in data inputted to the computing module.

Further, when the master process (apparatus for multi-module scheduling) transmits a call request to a computing module in a slave process by means of RPC, the call request carries a storage address of input data to the computing module and a storage address of output data from the computing module. The storage address of the input data and the storage address of the output data are addresses in a shared storage space corresponding to the slave process. Data communication between these computing modules can be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Figure 8:
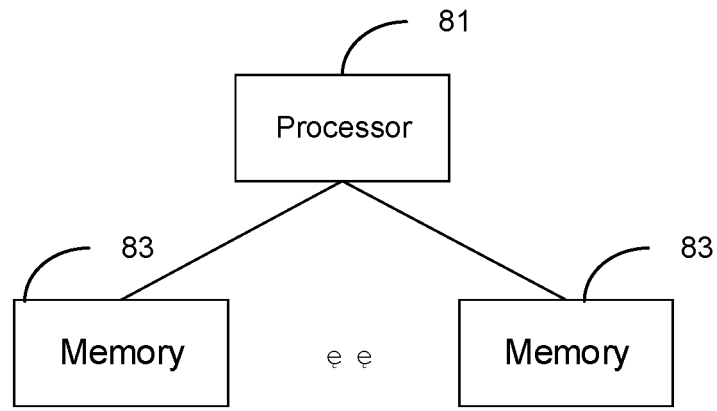
FIG. 8 is a schematic diagram showing a structure of an apparatus for multi-module scheduling according to some embodiments of the present disclosure.

Based on the same inventive concept, according to some embodiments of the present disclosure, an apparatus for multi-module scheduling is provided. As shown in FIG. 8, the apparatus includes a processor 81 and at least one memory 83 storing at least one machine executable instruction. The processor 81 is operative to execute the at least one machine executable instruction to: receive, in a current computing period, a call request of RPC from a master process, wherein for the apparatus for multi-module scheduling having a plurality of pieces of input data, the call request is transmitted by the master process when determining that all of the plurality of pieces of input data to the apparatus for multi-module scheduling are ready; perform processing in response to the call request; and feed a response back to the master process when the processing has completed.

In an embodiment, the processor 81 may be further operative to execute the at least one machine executable instruction such that the received call request includes an identifier of the computer module, a storage address of input data to the computing module and/or a storage address of output data from the computing module, the storage address of the output data being an address corresponding to the computing module in a shared storage space corresponding to the slave process or being an address corresponding to the computing module in a shared storage space corresponding to another slave process, and the storage address of the input data being an address in the shared storage space corresponding to the slave process.

In an embodiment, the processor 81 being operative to execute the at least one machine executable instruction to perform processing in response to the call request may include the processor being operative to execute the at least one machine executable instruction to: read, in response to the call request, the input data from the storage address of the input data for processing, and write the output data into the storage address of the output data.

With the apparatus for multi-module scheduling at the slave process according to the embodiment of the present disclosure, the slave process does not control the computation logics and the apparatus for multi-module scheduling operating as the computing module performs processing in response to the call by the master process. For a computing module having a plurality of pieces of input data, the call request is transmitted by the master process when determining that all of the plurality of pieces of input data to the computing module are ready, such that the consistency in the input data to the computing module in one computing period can be guaranteed. The situation in which the plurality of pieces of data are from different computing periods can be avoided, so as to solve the problem in the related art associated with inconsistency in data inputted to the computing module.

Further, in response to the call request, the computing module (apparatus for multi-module scheduling) in the slave process analyzes the call request to obtain the storage address of the input data to the computing module and the storage address of the output data from the computing module. The storage address of the input data and the storage address of the output data are both addresses in a shared storage space corresponding to the slave process. Data communication between these computing modules (apparatuses for multi-module scheduling) can be achieved by reading and writing data in the shared storage space, so as to improve the communication efficiency between the modules (apparatuses for multi-module scheduling), reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

In the following, an implementation of the solutions according to the present disclosure in a particular application scenario will be described.

The method for multi-module scheduling according to the present disclosure can be applied in deep learning in the automated driving technology.

As shown in FIG. 1, in the related art, in an example, a deep learning task in the autonomous driving technology typically includes the following modules: camera (sensor), vehicle detection, vehicle tracking, segmentation and fusion. The camera module captures images of a driving environment of a self-driving vehicle. The vehicle detection module identifies a position of the vehicle in each frame of image captured by the camera. The vehicle tracking module receives a sequence of consecutive frames of images outputted from the vehicle detection module as its input and identifies the same vehicle in the sequence of consecutive frames of images. The segmentation module identifies a position of a lane line. The fusion module calculates information on a road condition around the vehicle based on outputs from a plurality of vehicle mounted tracking modules.

Figure 9A:
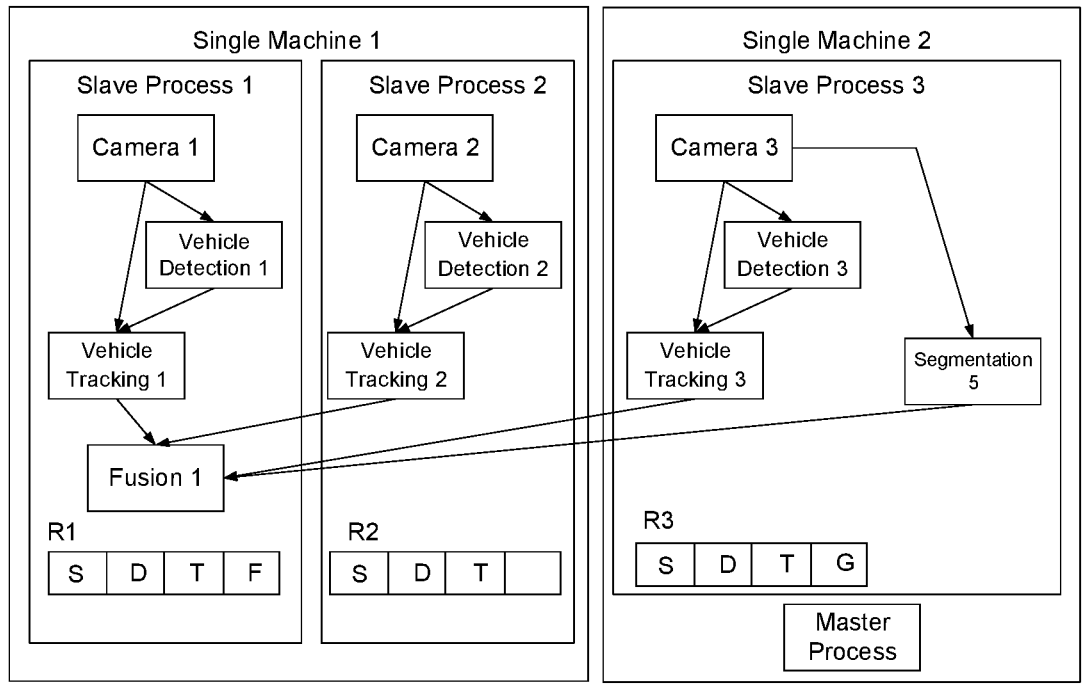
FIG. 9a is a schematic diagram showing a structure of a system for multi-module scheduling in an application scenario according to some embodiments of the present disclosure.

The solution of multi-module scheduling according to the present disclosure can be applied in a deep learning task in the automated driving technology. As shown in FIG. 9a, one Master Process and three Slave Processes (Servers) are provided. Slave Process 1 includes the following computing modules: Camera 1, Vehicle Detection 1, Vehicle Tracking 1 and Fusion 1. Slave Process 2 includes the following computing modules: Camera 2, Vehicle Detection 2 and Vehicle Tracking 2. Slave Process 3 includes the following computing modules: Camera 3, Vehicle Detection 3, Vehicle Tracking 3 and Segmentation 5. Slave Process 1 and Slave Process 2 are provided on Single Machine 1, and Master Process and Slave Process 3 are provided on Single Machine 2. In FIG. 9a, unidirectional arrows between computing modules represent computation directions and data transmission directions. For example, in Slave Process 1, input data to Vehicle Detection 1 is output data from Camera 1, input data to Vehicle Tracking 1 includes the output data from Camera 1 and output data from Vehicle Detection 1, input data to the computing module Fusion 1 includes output data from Vehicle Tracking 1 in Slave Process 1, output data from Vehicle Tracking 2 in Slave Process 2, output data from Vehicle Tracking 3 in Slave Process 3 and output data from Segmentation 5 in Slave Process 3. The same also applies to computation directions in the other slave processes and details thereof will be omitted here.

Each slave process is assigned with a shared storage space in which each computing module of the slave process is assigned with a corresponding storage address. As shown in FIG. 9a, shared storage spaces R1-3 are assigned for Slave Processes 1-3, respectively. In the shared storage space for Slave Process 1, storage spaces R1-S, R1-D, R1-T and R1-F are assigned for Camera 1, Vehicle Detection 1, Vehicle Tracking 1 and Fusion 1, respectively. Similarly, the shared storage space for Slave Process 2 includes R2-S, R2-D and R2-T, and the shared storage space for Slave Process 3 includes R3-S, R3-D, R3-T and R3-G. Data transmission between the computing modules can be achieved by writing output data into a corresponding storage space and reading input data from the shared storage space.

It can be seen from further analysis of FIG. 9a that the module Fusion 1 needs to read input data from different processes. That is, the module Fusion 1 needs not only the output data from the module Vehicle Tracking 1 in the same slave process, but also the output data from the module Vehicle Tracking 2 in Slave Process 2, the output data from the module Vehicle Tracking 3 in Slave Process 3 and the output data from the module Segmentation 5 in Slave Process 3. Data communication within one slave process can be performed by reading and writing data in the shared storage space, but data communication between computing modules of different slave processes cannot be performed in the same way.

Figure 9B:
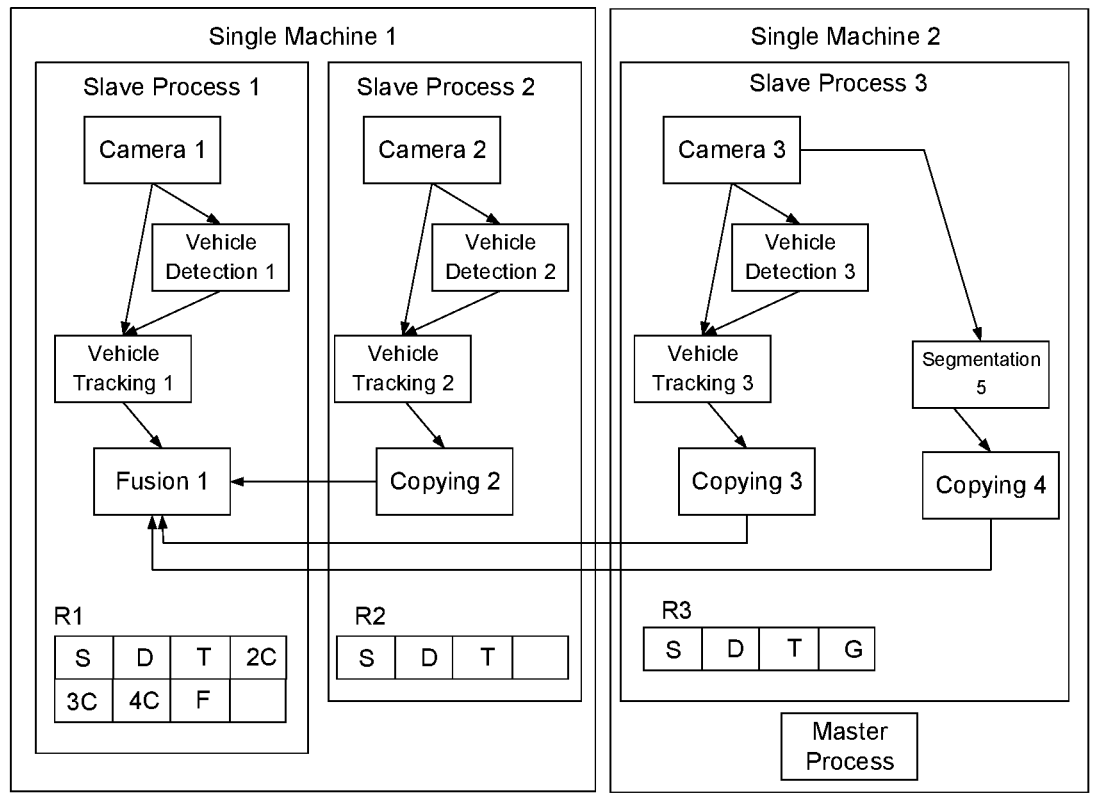
FIG. 9b is a schematic diagram showing another structure of a system for multi-module scheduling in an application scenario according to some embodiments of the present disclosure.

In order to solve this problem, in the deep learning task, a copying module can be provided for each of those modules that need inter-process data communication. A storage address in an inter-process shared storage space can be assigned for each copying module as the storage address of the output data, and the storage address of the output data can be carried in the call request of RPC transmitted from Master Process to each copying module. As shown in FIG. 9b, in the shared storage space for Slave Process 1, respective storage spaces, R1-2C, R1-3C and R1-4C, are assigned for a copying module 4' in Slave Process 2, a copying module 4" in Slave Process 3 and a copying module 4''' in Slave Process 3.

As shown in FIG. 9b, in response to the RPC request from Master Process, the copying module 2 reads data from the storage space R2-T corresponding to Vehicle Tracking 2 in the shared storage space for Slave Process 2 and writes the read data, as output data, into the storage address R1-2C corresponding to the copying module 2 in the shared storage space for Slave Process 1. The operation principles of the copying module 3 and the copying module 4 are similar.

With the copying modules, inter-process data transmission between the computing modules can be achieved.

Figure 10:
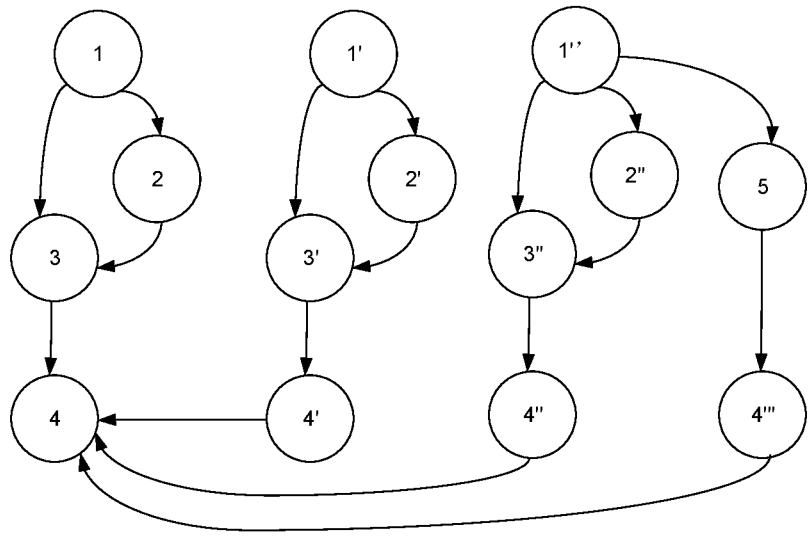
FIG. 10 is a schematic diagram showing directed computation graphs corresponding to slave processes in FIG. 9b.

Correspondingly to FIG. 9b, a configuration file is generated in advance for the deep learning task. The configuration file has a directed computation graph stored therein, which is shown in FIG. 10. In FIG. 10, correspondingly to Slave Process 1, Node 1 represents Camera 1, Node 2 represents Vehicle Detection 1, Node 3 represents Vehicle Tracking 1, and Node 4 represents the Fusion module. Correspondingly to Slave Process 2, Node 1' represents Camera 2, Node 2' represents Vehicle Detection 2, Node 3' represents Vehicle Tracking 2. Correspondingly to Slave Process 3, Node 1" represents Camera 3, and Node 2" represents Vehicle Detection 3, Node 3" represents Vehicle Tracking 3, and Node 5 represents the module Segmentation 5 in Slave Process 3. Moreover, in FIG. 10, Node 4' represents the copying module 2 in Slave Process 2, Node 4" represents the copying module 3 in Slave Process 3, and Node 4''' represents the copying module 4 in Slave Process 3.

In FIG. 10, unidirectional arrows between computing modules represent computation directions and data transmission directions, which are the same as those shown in FIG. 9.

The processing flow for the computing modules shown in FIG. 9b will be described below as a general processing flow.

Step S1: A master thread in Master Process reads a configuration file to obtain a directed computation graph as shown in FIG. 10.

Step S2: The master thread determines whether there is any computing module in computation in a current computing period (in particular, by determining whether the states of all the nodes are done). If so, the processing proceeds with step S3; or otherwise, the processing proceeds with step S4.

Step S3: The master thread determines that there is one or more computing modules in computation and enters a wait state.

Step S4: The master thread determines that the states of all the nodes are done and initializes the states of all the nodes and connecting edges in FIG. 10. In particular, the master thread sets the states of Node 1, Node 1' and Node 1" to ready and the states of the other nodes to unready, and sets the states of all the connecting edges to uncomplete.

Step S5: The master thread modifies the states of Node 1, Node 1' and Node 1" into run, pushes Node 1, Node 1' and Node 1" into a computing queue, and proceeds with the next computing period (the master thread returns to the step S2).

Note that in the following description, there is no correspondence between the slave threads in the thread pool and the slave processes or the computing modules. The slave threads are described in sequence for the purpose of illustration.

Step S6: Slave Thread a in the thread pool takes Node 1 from the computing queue and transmits a call request of RPC to the computing module Camera 1 corresponding to Node 1. The request carries a storage space of output data, i.e., the storage address R1-S for Camera 1 in the shared storage space for Slave Process 1.

Slave Thread b in the thread pool takes Node 1' from the computing queue and transmits a call request of RPC to the computing module Camera 2 corresponding to Node 1'. The request carries a storage space of output data, i.e., the storage address R2-S for Camera 2 in the shared storage space for Slave Process 2.

Slave Thread c in the thread pool takes Node 1" from the computing queue and transmits a call request of RPC to the computing module Camera 3 corresponding to Node 1". The request carries a storage space of output data, i.e., the storage address R3-S for Camera 3 in the shared storage space for Slave Process 3.

Step S7: In response to the call request, Camera 1 writes obtained data into the storage address R1-S in Slave Process 1 and feeds a response back to Slave Thread a.

In response to the call request, Camera 2 writes obtained data into the storage address R2-S in Slave Process 2 and feeds a response back to Slave Thread b.

In response to the call request, Camera 3 writes obtained data into the storage address R3-S in Slave Process 3 and feeds a response back to Slave Thread c.

Step S8: Upon receiving the response, Slave Thread a sets the state of Node 1 to done and the sates of two output edges 1-2 and 1-3 of Node 1 to complete.

Upon receiving the response, Slave Thread b sets the state of Node 1' to done and the sates of two output edges 1'-2' and 1'-3' of Node 1' to complete.

Upon receiving the response, Slave Thread c sets the state of Node 1" to done and the sates of three output edges 1"-2", 1"-3" and 1"-5 of Node 1" to complete.

Step S9: Slave Thread a modifies the state of Node 2 having its input edges in the complete state into ready.

Slave Thread b modifies the state of Node 2' having its input edges in the complete state into ready.

Slave Thread c modifies the state of Node 2" having its input edges in the complete state into ready, and modifies the state of Node 5 having its input edges in the complete state into ready.

Step S10: Slave Thread a traverses the states of the respective nodes in the directed computation graph, sets the state of Node 2 in the ready state to run, and pushes Node 2 into the computing queue.

Slave Thread b traverses the states of the respective nodes in the directed computation graph, sets the state of Node 2' in the ready state to run, and pushes Node 2' into the computing queue.

Slave Thread c traverses the states of the respective nodes in the directed computation graph, sets the states of Node 2" and Node 5 in the ready state to run, and pushes Node 2" and Node 5 into the computing queue.

Step S11: Slave Thread a takes Node 2 from the computing queue and transmits a call request of RPC to the module Vehicle Detection 1 corresponding to Node 2. The request carries a storage address of input data, which is the storage address R1-S for Camera 1 in the shared storage space for Slave Process 1, and a storage address of output data, which is the storage address R1-D for Vehicle Detection 1 in the shared storage space for Slave Process 1.

Slave Thread b takes Node 2' from the computing queue and transmits a call request of RPC to the module Vehicle Detection 2 corresponding to Node 2'. The request carries a storage address of input data, which is the storage address R2-S for Camera 2 in the shared storage space for Slave Process 2, and a storage address of output data, which is the storage address R2-D for Vehicle Detection 2 in the shared storage space for Slave Process 2.

Slave Thread c takes Node 2" from the computing queue and transmits a call request of RPC to the module Vehicle Detection 3 corresponding to Node 2". The request carries a storage address of input data, which is the storage address R3-S for Camera 3 in the shared storage space for Slave Process 3, and a storage address of output data, which is the storage address R3-D for Vehicle Detection 3 in the shared storage space for Slave Process 3.

Slave Thread d takes Node 5 from the computing queue and transmits a call request of RPC to the module Segmentation 5 corresponding to Node 5. The request carries a storage address of input data, which is the storage address R3-S for Camera 3 in the shared storage space for Slave Process 3, and a storage address of output data, which is the storage address R3-G for the module Segmentation 5 in the shared storage space for Slave Process 3.

Step S12: In response to the call request, Vehicle Detection 1 reads the input data from the shared storage space for Slave Process 1 for processing, writes output data into the storage address of output data as designated in the call request, and feeds a response back to Slave Thread a.

In response to the call request, Vehicle Detection 2 reads the input data from the shared storage space for Slave Process 2 for processing, writes output data into the storage address of output data as designated in the call request, and feeds a response back to Slave Thread b.

In response to the call request, Vehicle Detection 3 reads the input data from the shared storage space for Slave Process 3 for processing, writes output data into the storage address of output data as designated in the call request, and feeds a response back to Slave Thread c.

In response to the call request, the module Segmentation 5 reads the input data from the shared storage space for Slave Process 3 for processing, writes output data into the storage address of output data as designated in the call request, and feeds a response back to Slave Thread d.

Step S13: Upon receiving the response, Slave Thread a sets the state of Node 2 to done and the state of one output edge 2-3 of Node 2 to complete.

Upon receiving the response, Slave Thread b sets the state of Node 2' to done and the state of one output edge 2'-3' of Node 2' to complete.

Upon receiving the response, Slave Thread c sets the state of Node 2" to done and the state of one output edge 2"-3" of Node 2" to complete.

Upon receiving the response, Slave Thread d sets the state of Node 5 to done and the state of one output edge 5-4'" of Node 5 to complete.

Step S14: Slave Thread a modifies the state of Node 3 having its input edges 1-3 and 2-3 in the complete state into ready.

Slave Thread b modifies the state of Node 3' having its input edges 1'-3' and 2'-3' in the complete state into ready.

Slave Thread c modifies the state of Node 3" having its input edges 1"-3" and 2"-3" in the complete state into ready.

Slave Thread d modifies the state of Node 4''' having its input edge 5-4''' in the complete state into ready.

Step S15: Slave Thread a traverses the states of the respective nodes in the directed computation graph, sets the state of Node 3 in the ready state to run, and pushes Node 3 into the computing queue.

Slave Thread b traverses the states of the respective nodes in the directed computation graph, sets the state of Node 3' in the ready state to run, and pushes Node 3' into the computing queue.

Slave Thread c traverses the states of the respective nodes in the directed computation graph, sets the state of Node 3" in the ready state to run, and pushes Node 3" into the computing queue.

Slave Thread d traverses the states of the respective nodes in the directed computation graph, sets the state of Node 4''' in the ready state to run, and pushes Node 4" into the computing queue.

Step S16: Slave Thread a takes Node 3 from the computing queue and transmits a call request of RPC to the module Vehicle Tracking 1 corresponding to Node 3. The request carries storage addresses of input data, which are the storage address R1-S for Camera 1 in the shared storage space for Slave Process 1 and the storage address R1-D for Vehicle Detection 1 in the shared storage space for Slave Process 1, and a storage address of output data, which is the storage address R1-T for Vehicle Tracking 1 in the shared storage space for Slave Process 1.

Slave Thread b takes Node 3' from the computing queue and transmits a call request of RPC to the module Vehicle Tracking 2 corresponding to Node 3'. The request carries storage addresses of input data, which are the storage address R2-S for Camera 2 in the shared storage space for Slave Process 2 and the storage address R2-D for Vehicle Detection 2 in the shared storage space for Slave Process 2, and a storage address of output data, which is the storage address R2-T for Vehicle Tracking 2 in the shared storage space for Slave Process 2.

Slave Thread c takes Node 3" from the computing queue and transmits a call request of RPC to the module Vehicle Tracking 3 corresponding to Node 3". The request carries storage addresses of input data, which are the storage address R3-S for Camera 3 in the shared storage space for Slave Process 3 and the storage address R3-D for Vehicle Detection 3 in the shared storage space for Slave Process 3, and a storage address of output data, which is the storage address R3-T for Vehicle Tracking 3 in the shared storage space for Slave Process 3.

Slave Thread d takes Node 4''' from the computing queue and transmits a call request of RPC to the copying module 4 corresponding to Node 4'''. The request carries a storage address of input data, which is the storage address R3-G for the module Segmentation 5 in the shared storage space for Slave Process 3, and a storage address of output data, which is the storage address R1-4C for the copying module 4 in the shared storage space for Slave Process 1.

Step S17: In response to the call request, Vehicle Tracking 1 reads the input data from the shared storage space for Slave Process 1 for processing, writes output data into the storage address of output data as designated in the call request, and feeds a response back to Slave Thread a.

In response to the call request, Vehicle Tracking 2 reads the input data from the shared storage space for Slave Process 2 for processing, writes output data into the storage address of output data as designated in the call request, and feeds a response back to Slave Thread b.

In response to the call request, Vehicle Tracking 3 reads the input data from the shared storage space for Slave Process 3 for processing, writes output data into the storage address of output data as designated in the call request, and feeds a response back to Slave Thread c.

In response to the call request, the copying module 4''' reads the input data from the shared storage space for Slave Process 3, writes the read data as output data into an address in the shared storage space for Slave Process 1, and feeds a response back to Slave Thread d.

Step S18: Upon receiving the response, Slave Thread a sets the state of Node 3 to done and the state of one output edge 3-4 of Node 3 to complete.

Upon receiving the response, Slave Thread b sets the state of Node 3' to done and the state of one output edge 3'-4' of Node 3' to complete.

Upon receiving the response, Slave Thread c sets the state of Node 3" to done and the state of one output edge 3"-4" of Node 3" to complete.

Upon receiving the response, Slave Thread d sets the state of Node 4''' to done and the state of one output edge 4'''-4 of Node 4''' to complete.

Step S19: Slave Thread b modifies the state of Node 4' having its input edge 3'-4' in the complete state into ready.

Slave Thread c modifies the state of Node 4" having its input edge 3"-4" in the complete state into ready.

Step S20: Slave Thread b traverses the states of the respective nodes in the directed computation graph, sets the state of Node 4' in the ready state to run, and pushes Node 4' into the computing queue.

Slave Thread c traverses the states of the respective nodes in the directed computation graph, sets the state of Node 4" in the ready state to run, and pushes Node 4" into the computing queue.

Step S21: Slave Thread b takes Node 4' from the computing queue and transmits a call request of RPC to the copying module 2 corresponding to Node 4'. The request carries a storage address of input data, which is the storage address R2-T for Vehicle Tracking 2 in the shared storage space for Slave Process 2, and a storage address of output data, which is the storage address R1-2C for the copying module 2 in the shared storage space for Slave Process 1.

Slave Thread c takes Node 4" from the computing queue and transmits a call request of RPC to the copying module 3 corresponding to Node 4". The request carries a storage address of input data, which is the storage address R3-T for Vehicle Tracking 3 in the shared storage space for Slave Process 3, and a storage address of output data, which is the storage address R1-3C for the copying module 3 in the shared storage space for Slave Process 1.

Step S22: In response to the call request, the copying module 2 reads the input data from the shared storage space for Slave Process 2, writes the output data into an address in the shared storage space for Slave Process 1, and feeds a response back to Slave Thread b.

In response to the call request, the copying module 3 reads the input data from the shared storage space for Slave Process 3, writes the read data as output data into an address in the shared storage space for Slave Process 1, and feeds a response back to Slave Thread c.

Step S23: Upon receiving the response, Slave Thread b sets the state of Node 4' to done and the state of one output edge 4'-4 of Node 4' to complete.

Upon receiving the response, Slave Thread c sets the state of Node 4" to done and the state of one output edge 4"-4 of Node 4" to complete.

Step S24: Slave Thread a modifies the state of Node 4 having all its input edges 3-4, 4'-4, 4"-4 and 4"-4 in the complete state into ready.

Step S25: Slave Thread a traverses the states of the respective nodes in the directed computation graph, sets the state of Node 4 in the ready state to run, and pushes Node 4 into the computing queue.

Step S26: Slave Thread a takes Node 4 from the computing queue and transmits a call request of RPC to the module Fusion 4 corresponding to Node 4. The request carries storage addresses of input data, which are the storage address R1-T for Vehicle Tracking 1 in the shared storage space for Slave Process 1, the storage address R1-2C for the copying module 2 in the shared storage space for Slave Process 1, the storage address R1-3C for the copying module 3 in the shared storage space for Slave Process 1, and the storage address R1-4C for the copying module 4 in the shared storage space for Slave Process 1.

Step S27: In response to the call request, the module Fusion 4 reads the input data from the shared storage space for Slave Process 1 for processing, uses the processing result as the processing result of the current processing period, outputs the processing result, and feeds a response back to Slave Thread a.

Step S28: Upon receiving the response, Slave Thread a sets the state of Node 4 to done.

Step S29: Slave Thread a traverses the states of the respective nodes in the directed computation graph, determines that the states of all the nodes in the directed computation graph are done, and notify or wake the master thread in the wait state in the step S3 to proceed with the next computing period, i.e., to proceed with the step S4.

It can be seen from the above processing that, the master process controls computation logics of all computing modules in a slave process in accordance with a directed computation graph. That is, the master process controls execution of the computing modules by means of RPC, and maintains states of nodes corresponding to the modules and states of outputs of the nodes based on executions of the modules. A computing module corresponding to a node may be called and executed only when the states of all input edges of the node are complete, and the state of the node and the state of each output edge of the node are updated when a response is received. That is, a computing module will be called and executed only when all pieces of input data in one computing period are complete, such that the consistency in the input data to the computing module may be guaranteed.

Further, each slave process has a corresponding shared storage space including a storage space for each computing module in the process. Instead of transmitting data between the computing modules in accordance with the communication mechanism between processes, data is read and written using the storage space shared within the process, so as to achieve improved communication efficiency between the computing modules, reduced communication delay, improved overall communication efficiency among multiple modules and increased system throughput.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for multi-module scheduling, comprising:
reading, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge therebetween, an incoming connecting edge of a node being an input edge and an outgoing connecting edge of a node being an output edge;
initializing, by the master process, states of all the nodes and connecting edges initially in computation in a current computing period;
determining a node to be called based on the computation direction in the directed computation graph and the states of the nodes, the node to be called comprising a node having all of its input edges in a complete state;
transmitting, to the computing module in the slave process corresponding to the node to be called, a call request of Remote Process Call (RPC) to execute the computing module, wherein said transmitting comprises taking, by a thread in the master process, one node from a computing queue and transmitting the call request to the computing module in the slave process corresponding to the one node;
updating the state of the one node and the state of each output edge of the one node upon receiving a response to the call request; and
proceeding with a next computing period upon determining that the states of all the nodes have been updated,
wherein the master process comprises a master thread and a thread pool comprising a plurality of slave threads,
wherein the state of each node comprises an unready state, a ready state, a run state or a done state,
wherein the state of each connecting edge comprises an uncomplete state or the complete state, and
wherein the initializing, by the master process, comprises:
determining, by the master thread initially in computation, whether all the nodes in the directed computation graph are in the done state, and
if so, resetting the state of a starting node in the directed computation graph to the ready state, setting the states of all the other nodes to the unready state and setting the states of all the connecting edges to the uncomplete state, or otherwise setting, by the master thread, a state of the master thread to a wait state.

2. The method of claim 1, wherein said determining the node to be called based on the computation direction in the directed computation graph and the states of the nodes comprises:
traversing, by the master thread initially in computation after initializing the states of all the nodes and connecting edges, the states of the respective nodes in the directed computation graph in accordance with the computation direction, determining a node in the ready state as the node to be called, the node in the ready state comprising the starting node, modifying the state of the node to be called into the run state, pushing the node to be called into the computing queue and proceeding with the next computing period; or traversing, by one slave thread in the thread pool in computation, the states of the respective nodes in the directed computation graph in accordance with the computation direction, determining each node in the ready state as a node to be called, the node in the ready state comprising the node having all of its input edges in the complete state, modifying the state of each node to be called into the run state, and pushing each node to be called into the computing queue.

3. The method of claim 1, further comprising:

determining, by one slave thread in the thread pool, an identifier of the computing module corresponding to the one node taken from the computing queue and a storage address of input data to the computing module and/or a storage address of output data from the computing module in accordance with the pre-stored configuration file, and including the identifier of the computing module, the storage address of the input data and/or the storage address of the output data in the call request.

4. The method of claim 3, wherein the storage address of the output data from the computing module is an address corresponding to the computing module in a shared storage space corresponding to the slave process in which the computing module is comprised, or the storage address of the output data is an address corresponding to the computing module in a shared storage space corresponding to another slave process.

5. The method of claim 3, wherein the storage address of the input data to the computing module is an address in the shared storage space corresponding to the slave process in which the computing module is comprised.

6. The method of claim 1, wherein said updating the state of the one node and the state of each output edge of the one node upon receiving the response to the call request comprises:

setting, by one slave thread in the thread pool upon receiving the response to the call request transmitted for the one node, the state of the one node to the done state, modifying the state of each output edge of the one node into the complete state, and setting the state of each node having all its input edges in the complete state to the ready state.

7. The method of claim 1, wherein said proceeding with the next computing period upon determining that the states of all the nodes have been updated comprises:

traversing, by one slave thread in the thread pool, the states of the respective nodes in the directed computation graph, and notifying the master thread in the wait state to proceed with the next computing period in response to determining that all the nodes in the directed computation graph are in the done state.

8. An apparatus for multi-module scheduling, comprising a processor and at least one memory storing at least one machine executable instruction, the processor being operative to execute the at least one machine executable instruction to:

provide a master thread and a thread pool comprising a plurality of slave threads;

read a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge therebetween, an incoming connecting edge of a node being an input edge and an outgoing connecting edge of a node being an output edge;

initialize states of all the nodes and connecting edges initially in computation in a current computing period;

determine a node to be called based on the computation direction in the directed computation graph and the states of the nodes, the node to be called comprising a node having all of its input edges in a complete state;

transmit, to the computing module in the slave process corresponding to the node to be called, a call request of Remote Process Call (RPC) to execute the computing module, wherein said transmit comprises taking, by a thread, one node from a computing queue and transmitting the call request to the computing module in the slave process corresponding to the one node;

update the state of the one node and the state of each output edge of the one node upon receiving a response to the call request; and proceed with a next computing period upon determining that the states of all the nodes have been updated, wherein the state of each node comprises an unready state, a ready state, a run state or a done state, and the state of each connecting edge comprises an uncomplete state or the complete state; and wherein the processor being operative to execute the at least one machine executable instruction to initialize the states of all the nodes and connecting edges initially in computation in the current computing period comprises the master thread being configured to:

determine initially in computation whether all the nodes in the directed computation graph are in the done state, and if so, reset the state of a starting node in the directed computation graph to the ready state, set the states of all the other nodes to the unready state and set the states of all the connecting edges to the uncomplete state, or otherwise set a state of the master thread to a wait state, or wherein the processor being operative to execute the at least one machine executable instruction to determine the node to be called based on the computation direction in the directed computation graph and the states of the nodes comprises:

the master thread being configured to traverse, initially in computation after initializing the states of all the nodes and connecting edges, the states of the respective nodes in the directed computation graph in accordance with the computation direction, determine a node in the ready state as the node to be called, the node in the ready state comprising the starting node, modify the state of the node to be called into the run state, push the node to be called into a computing queue and proceed with the next computing period; or one slave thread in the thread pool being configured to traverse, in computation, the states of the respective nodes in the directed computation graph in accordance with the computation direction, determine each node in the ready state as a node to be called, the node in the ready state comprising the node having all of its input edges in the complete state, modify the state of each node to be called into the run state, and push each node to be called into a computing queue.

9. The apparatus of claim 8, wherein the processor is further operative to execute the at least one machine executable instruction to:
determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request,
wherein the storage address of the output data from the computing module is an address corresponding to the computing module in a shared storage space corresponding to the slave process in which the computing module is comprised, or the storage address of the output data is an address corresponding to the computing module in a shared storage space corresponding to another slave process, and
the storage address of the input data to the computing module is an address in the shared storage space corresponding to the slave process in which the computing module is comprised.

10. The apparatus of claim 8, wherein the processor being operative to execute the at least one machine executable instruction to update the state of the one node and the state of each output edge of the one node upon receiving the response to the call request comprises one slave thread in the thread pool being configured to:
set, upon receiving the response to the call request transmitted for the one node, the state of the one node to the done state, modify the state of each output edge of the one node into the complete state, and set the state of each node having all its input edges in the complete state to the ready state.

11. The apparatus of claim 8, wherein the processor being operative to execute the at least one machine executable instruction to proceed with the next computing period upon determining that the states of all the nodes have been updated comprises one slave thread in the thread pool being configured to:
traverse the states of the respective nodes in the directed computation graph, and in response to determining that all the nodes in the directed computation graph are in the done state, notify the master thread in the wait state to proceed with the next computing period.

12. A method for multi-module scheduling, comprising:
reading, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge therebetween, an incoming connecting edge of a node being an input edge and an outgoing connecting edge of a node being an output edge, wherein the master process comprises a master thread and a thread pool comprising a plurality of slave threads, wherein the state of each node comprises an unready state, a ready state, a run state or a done state, and wherein the state of each connecting edge comprises an uncomplete state or a complete state;
initializing, by the master process, states of all the nodes and connecting edges initially in computation in a current computing period;
determining a node to be called based on the computation direction in the directed computation graph and the states of the nodes, the node to be called comprising a node having all of its input edges in the complete state;
transmitting, to the computing module in the slave process corresponding to the node to be called, a call request of Remote Process Call (RPC) to execute the computing module, wherein said transmitting comprises taking, by a thread in the master process, one node from a computing queue and transmitting the call request to the computing module in the slave process corresponding to the one node;
determining, by one slave thread in the thread pool, an identifier of the computing module corresponding to the one node taken from the computing queue and a storage address of input data to the computing module and/or a storage address of output data from the computing module in accordance with the pre-stored configuration file, and including the identifier of the computing module, the storage address of the input data and/or the storage address of the output data in the call request;
updating the state of the one node and the state of each output edge of the one node upon receiving a response to the call request; and
proceeding with a next computing period upon determining that the states of all the nodes have been updated.

13. The method of claim 12, wherein the storage address of the output data from the computing module is an address corresponding to the computing module in a shared storage space corresponding to the slave process in which the computing module is comprised, or the storage address of the output data is an address corresponding to the computing module in a shared storage space corresponding to another slave process.

14. The method of claim 12, wherein the storage address of the input data to the computing module is an address in the shared storage space corresponding to the slave process in which the computing module is comprised.

15. A method for multi-module scheduling, comprising:
reading, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge therebetween, an incoming connecting edge of a node being an input edge and an outgoing connecting edge of a node being an output edge;
initializing, by the master process, states of all the nodes and connecting edges initially in computation in a current computing period;
determining a node to be called based on the computation direction in the directed computation graph and the states of the nodes, the node to be called comprising a node having all of its input edges in a complete state;

transmitting, to the computing module in the slave process corresponding to the node to be called, a call request of Remote Process Call (RPC) to execute the computing module, wherein said transmitting comprises taking, by a thread in the master process, one node from a computing queue and transmitting the call request to the computing module in the slave process corresponding to the one node;

updating the state of the one node and the state of each output edge of the one node upon receiving a response to the call request; and proceeding with a next computing period upon determining that the states of all the nodes have been updated;

wherein the master process comprises a master thread and a thread pool comprising a plurality of slave threads;

wherein the state of each node comprises an unready state, a ready state, a run state or a done state;

wherein the state of each connecting edge comprises an uncomplete state or the complete state; and wherein said updating the state of the one node and the state of each output edge of the one node upon receiving the response to the call request comprises:
  setting, by one slave thread in the thread pool upon receiving the response to the call request transmitted for the one node, the state of the one node to the done state, modifying the state of each output edge of the one node into the complete state, and setting the state of each node having all its input edges in the complete state to the ready state, or wherein said proceeding with the next computing period upon determining that the states of all the nodes have been updated comprises:
  traversing, by one slave thread in the thread pool, the states of the respective nodes in the directed computation graph, and notifying the master thread in the wait state to proceed with the next computing period in response to determining that all the nodes in the directed computation graph are in the done state.

16. An apparatus for multi-module scheduling, comprising a processor and at least one memory storing at least one machine executable instruction, the processor being operative to execute the at least one machine executable instruction to:
  provide a master thread and a thread pool comprising a plurality of slave threads;
  read a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge therebetween, an incoming connecting edge of a node being an input edge and an outgoing connecting edge of a node being an output edge;
  initialize states of all the nodes and connecting edges initially in computation in a current computing period;
  determine a node to be called based on the computation direction in the directed computation graph and the states of the nodes, the node to be called comprising a node having all of its input edges in a complete state;
  transmit, to the computing module in the slave process corresponding to the node to be called, a call request of Remote Process Call (RPC) to execute the computing module, wherein said transmit comprises taking, by a thread, one node from a computing queue and transmitting the call request to the computing module in the slave process corresponding to the one node;
  update the state of the one node and the state of each output edge of the one node upon receiving a response to the call request; and
  proceed with a next computing period upon determining that the states of all the nodes have been updated, wherein the state of each node comprises an unready state, a ready state, a run state or a done state, and the state of each connecting edge comprises an uncomplete state or the complete state, and wherein the processor is operative to execute the at least one machine executable instruction to determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request, wherein the storage address of the output data from the computing module is an address corresponding to the computing module in a shared storage space corresponding to the slave process in which the computing module is comprised, or the storage address of the output data is an address corresponding to the computing module in a shared storage space corresponding to another slave process, and the storage address of the input data to the computing module is an address in the shared storage space corresponding to the slave process in which the computing module is comprised, or wherein the processor being operative to execute the at least one machine executable instruction to update the state of the one node and the state of each output edge of the one node upon receiving the response to the call request comprises one slave thread in the thread pool being configured to:
  set, upon receiving the response to the call request transmitted for the one node, the state of the one node to the done state, modify the state of each output edge of the one node into the complete state, and set the state of each node having all its input edges in the complete state to the ready state, or wherein the processor being operative to execute the at least one machine executable instruction to proceed with the next computing period upon determining that the states of all the nodes have been updated comprises one slave thread in the thread pool being configured to:
  traverse the states of the respective nodes in the directed computation graph, and in response to determining that all the nodes in the directed computation graph are in the done state, notify the master thread in the wait state to proceed with the next computing period.

* * * * *

UNITED STATES PATENT AND TRADEMARK OFFICE
CERTIFICATE OF CORRECTION

PATENT NO. : 11,055,144 B2
APPLICATION NO. : 16/276084
DATED : July 6, 2021
INVENTOR(S) : Gong et al.

Page 1 of 1

It is certified that error appears in the above-identified patent and that said Letters Patent is hereby corrected as shown below:

In the Specification

In Column 23, Line 21, delete "4"" and insert -- 4''' --, therefor.

In Column 23, Line 55, delete "4"." and insert -- 4'''. --, therefor.

In Column 25, Line 5, delete "4"-4" and insert -- 4'''-4 --, therefor. (second occurrence)

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*